(12) United States Patent
Benedikt et al.

(10) Patent No.: US 11,720,730 B2
(45) Date of Patent: Aug. 8, 2023

(54) METHOD FOR CONFIGURING A CO-SIMULATION FOR A TOTAL SYSTEM

(71) Applicant: Virtual Vehicle Research GmbH, Graz (AT)

(72) Inventors: Martin Benedikt, Graz (AT); Jost Bernasch, Graz (AT); Franz Holzinger, Graz (AT); Daniel Watzenig, Graz (AT)

(73) Assignee: Virtual Vehicle Research GmbH, Graz (AT)

( * ) Notice: Subject to any disclaimer, the term of this patent is extended or adjusted under 35 U.S.C. 154(b) by 500 days.

(21) Appl. No.: 16/067,324

(22) PCT Filed: Dec. 29, 2016

(86) PCT No.: PCT/EP2016/082809
§ 371 (c)(1),
(2) Date: Jun. 29, 2018

(87) PCT Pub. No.: WO2017/114883
PCT Pub. Date: Jul. 6, 2017

(65) Prior Publication Data
US 2019/0018916 A1 Jan. 17, 2019

(30) Foreign Application Priority Data

Dec. 30, 2015 (EP) .................................... 15203199

(51) Int. Cl.
*G06F 30/33* (2020.01)
*G06F 117/08* (2020.01)

(52) U.S. Cl.
CPC .......... *G06F 30/33* (2020.01); *G06F 2117/08* (2020.01)

(58) Field of Classification Search
CPC .. G06F 30/33; G06F 2117/08; G06F 30/3308; G06F 30/3315; G06F 2111/00–2119/22
See application file for complete search history.

(56) References Cited

U.S. PATENT DOCUMENTS

| | | | |
|---|---|---|---|
| 6,216,063 B1* | 4/2001 | Lind ........................ | B64F 5/60 |
| | | | 701/4 |
| 2012/0197617 A1 | 8/2012 | Mujagic et al. | |

(Continued)

FOREIGN PATENT DOCUMENTS

| | | |
|---|---|---|
| AT | 509930 A2 | 12/2011 |
| EP | 2 442 248 A1 | 4/2012 |

(Continued)

OTHER PUBLICATIONS

Stettinger et al. "A Model-Based Approach for Prediction-Based Interconnection of Dynamic Systems" 53rd IEEE Conf. on Decision and Control (Dec. 15, 2014), pp. 3286-3291; doi:10.1109/CDC.2014.7039897 [retrieved on Oct. 5, 2020]. Retrieved from <https://ieeexplore.ieee.org/abstract/document/7039897> (Year: 2014).*

(Continued)

*Primary Examiner* — Rehana Perveen
*Assistant Examiner* — Alfred H B Wechselberger
(74) *Attorney, Agent, or Firm* — Robert A. Blaha; Smith Tempel Blaha LLC

(57) ABSTRACT

A method and system (and/or a total simulation) have at least first and second sub-systems. An interconnection network is determined, which couples and determines the first and the second sub-systems at a coupling. First sub-system information of the first sub-system and second sub-system information of the second sub-system are determined. An execution sequence is selected, by which it is determined, in which sequence relative to each other a first and a second parameter outputs are determined. Furthermore, extrapolation methods are determined, by which first and second parameter inputs (Continued)

are determinable during a macro step size (e.g. between the coupling times). The macro step size prescribes-coupling times, at which an exchange of corresponding first and second input parameters and of the first and the second output parameters between the sub-systems is performed. The coupling of the sub-systems is configured based on the interconnection network, the first sub-system information and the second sub-system information, the execution sequence, the extrapolation methods, and the macro step size, and the co-simulation is performed.

12 Claims, 4 Drawing Sheets

(56) References Cited

U.S. PATENT DOCUMENTS

| | | | | |
|---|---|---|---|---|
| 2014/0005989 A1* | 1/2014 | Belsky | ............ | G06F 17/13 703/2 |
| 2014/0278303 A1* | 9/2014 | Larimore | ............ | G06F 30/20 703/2 |

FOREIGN PATENT DOCUMENTS

| | | | | |
|---|---|---|---|---|
| EP | 2442248 | * | 4/2012 | ......... G06F 30/33 |
| WO | 2014170188 A1 | | 10/2014 | |

OTHER PUBLICATIONS

Benedikt et al. "An Adaptive Coupling Methodology for Fast Time-Domain Distributed Heterogeneous Co-Simulation" Technical Paper 2010-01-0649, SAE 2010 World Congress and Exhibition, doi:10.4271/2010-01-0649 [retrieved on Oct. 7, 2020]. (Year: 2010).*

Benedikt et al. "Macro-step-size Selection and Monitoring of the Coupling Error for Weak Coupled Subsystems in the Frequency-domain" Idelsohn et al. (Eds.) V International Conference on Computational Methods for Coupled Problems in Science and Engineering, pp. 1009-1020 [retrieved on Oct. 5, 2020]. (Year: 2013).*

Broman et al. "Determinate Composition of FMUs for Co-Simulation" Technical Report No. UCB/EECS-2013-153, Electrical Engineering and Computer Sciences, UC Berkeley [retrieved on Jul. 9, 2019] (Year: 2013).*

Stettinger et al. "On the Difficulties of Real-time Co-simulation" Idelsohn et al. (Eds.) V International Conference on Computational Methods for Coupled Problems in Science and Engineering, pp. 989-999 [retrieved on Oct. 5, 2020]. (Year: 2013).*

Benedikt et al. "Modelling and analysis of the non-iterative coupling process for co-simulation" Mathematical and Computer Modelling of Dynamical Systems, vol. 19, No. 5, pp. 451-471, doi:10.1080/13873954.2013.784340 [retrieved on Oct. 5, 2020] (Year: 2013).*

Stettinger et al. "Model-based Coupling Approach for non-iterative Real-Time Co-Simulation" 2014 European Control Conference, Strasbourg, France (Jul. 2014), pp. 2084-2089 [retrieved on Oct. 5, 2020]. Retrieved from <https://ieeexplore.ieee.org/abstract/document/6862242> (Year: 2014).*

"FMI for Co-simulation" 07006, [Version 1.0] Modelisar consortium, ITEA 2 [retrieved on Jul. 8, 2019] (Year: 2010).*

"FMI for Model Exchange" 07006, [Version 1.0] Modelisar consortium, ITEA2 [retrieved on Jul. 8, 2019] (Year: 2010).*

Karner et al. "A Comprehensive Approach for Modeling, Simulation and Virtual Validation of Integrated Safety Systems" J. Fischer-Wolfarth and G. Meyer (eds.), Advanced Microsystems for Automotive Applications 2013, Lecture Notes in Mobility, DOI: 10.1007/978-3-319-00476-1_10. Retrieved on Oct. 5, 2020. (Year: 2013).*

Van Acker et al. "Generation of an Optimised Master Algorithm for FMI Co-simulation" [Preprint] TMS/DEVS 2015 Apr. 12-15, 2015 [retrieved on Oct. 23, 2021] (Year: 2015).*

Stettinger et al. "Extending Co-Simulation to the Real-Time Domain" 2013-01-0421, SAE International; doi:10.4271/2013-01-0421 [retrieved on Oct. 7, 2020] (Year: 2013).*

Khaled, A. "Distributed real-time simulation of numerical models: application to powertrain" [Thesis] Universite de Grenoble, pp. 113-117 [retrieved on Sep. 9, 2022] (Year: 2014).*

Ntogramatzidis, L. "Disturbance decoupling by state feedback and PD control law for systems with direct feedthrough matrices" Proceedings of the 46th IEEE Conference on Decision and Control New Orleans, LA, USA, Dec. 12-14, 2007 [retrieved on Sep. 9, 2022] (Year: 2007).*

Kubler et al. "Modular Simulation in Multibody System Dynamics" Multibody System Dynamics vol. 4: pp. 107-127 [retrieved on Sep. 2, 2022] (Year: 2000).*

Miyachi, M.; Office Action in Japan Patent Application No. 2018-531244, dated Mar. 10, 2020, pp. 1-3; Japan Patent Office, 3-4-3 Kasumigaseki, Chiyoda-ku, Tokyo, 100-8915, Japan.

Bastien, J. et al.; Master for Co-Simulation Using FMI; Proceedings of Conference Modelica 2011, Mar. 20-22, 2011, Dresden Germany, Mar. 20, 2011; XP055083500, DOI: 10.3384/ecp11063115.

Nesciobelli, K.; Communication Concerning Article 94(3) in Application No. 16819948.7; pp. 1-12; dated May 13, 2020; European Patent Office, 80298, Munich, Germany.

Nesciobelli, K.; Communication Concerning Article 94(3) in Application No. 16819948.7 (English Translation); pp. 1-6; dated May 13, 2020; European Patent Office, 80298, Munich, Germany.

* cited by examiner

METHOD FOR CONFIGURING A CO-SIMULATION FOR A TOTAL SYSTEM

CROSS-REFERENCE TO RELATED APPLICATIONS

The present application is a national phase patent application derived from the international patent application PCT/EP2016/082809, which was filed on Dec. 29, 2016, and which claims the benefit of the priority day of the European patent application no. EP 15 203 199.3, filed Dec. 30, 2015, both of which earlier applications are incorporated herein by reference in their entirety.

TECHNICAL FIELD

Embodiments of the invention relate to a method and an apparatus for configuring a co-simulation for a total system.

TECHNOLOGICAL BACKGROUND

A virtual development of technical systems is state of the art and enables system analyses and virtual testing at an early stage, and thus results in time savings and cost savings. In this connection, models for the specific components are developed in each engineering discipline (e.g. mechanical engineering, electronical engineering, etc.), and are simulated and analyzed separately. Influences from other systems are considered only to a limited extent. However, the development of a total system requires an interaction of all technical domains and/or all components, such that these interactions must be mapped also in the virtual plane. Co-simulation offers a possibility, to bring together the models, which have been modelled distributedly and simulated distributedly. In this connection, the coupling quantities (or linking quantities) are exchanged during the simulation at defined times (or at defined points in time), after so-called macro time steps. The properties of the simulation tools used and the characteristics of the models determine which coupling algorithm can be used. If simulation tools or simulated models (e.g. FMI) allow a repeating of a calculation step, then iterative (implicit) approaches (strong coupling) can be applied. For the most part however, a resetting of the simulation tools and of the simulation models required for this is not supported, or the simulation has to be effected in real time, such that non-iterative (explicit) approaches must be sought. For non-iterative co-simulation, in the case of internal loops (data dependencies), however, an extrapolation of coupling quantities over (or during) the present macro time step is mandatory and results in inaccuracies.

The error generated thereby can be kept negligibly small by a suitable configuration of the co-simulation, however, according to the state of the art must be effected manually by the operator of the co-simulation. This is costly in terms of times and mostly also not practicable manually by the operator of the co-simulation due to the prevailing complexity of the co-simulation.

AT 509930 A2 having the title "Modellbasierte Methodik and Verfahren zur Quantifizierung der Qualität der Resultate von Co-Simulationen" (in English: "Model-based methodology and method for quantifying the quality of the results of co-simulations") describes a method for assessing the quality of the co-simulated total system. Approximated model descriptions, coupling information and the execution sequence are used as static meta-information beside the modelled coupling uncertainties introduced by extrapolation in order to determine the quality in advance, i.e. prior to the start of the co-simulation.

In the co-simulation, modelled sub-systems are coupled via the input and output parameters of the models to a total model. In this connection, sub-systems represent algebraic and/or differential systems of equations. Each sub-system is however solved and/or simulated independently from other sub-systems over (or during) a macro time step by a proper (or own) numerical solution algorithm. Solution algorithms are typically selected by the operator as a function of the system of equations that is present and to be solved. A specific numerical solution algorithm (solver) is used in each simulator of a sub-system. In the case of network-internal loops, data dependencies arise between the involved sub-systems, such that, as a function of the execution sequence—parallel or sequentially —, more or less coupling quantities (input parameters) must be "estimated" by extrapolation methods over the macro time step to be solved. This extrapolation is necessary in order to solve the prevailing problem of causality and results inevitably in a necessary error.

This error, which is introduced inevitably by the coupling, influences to some extent significantly the physical behavior of the distributed system. If for example a force serves as the coupling quantity in such a co-simulation, the coupling error affects directly the behavior of the total system, for example by an erroneous acceleration of an inertia.

SUMMARY

There may be a need to establish and to improve a configuration of a co-simulation.

This need may be met by a method for configuring a co-simulation for a total system (or overall system) and by an apparatus for configuring a co-simulation for a total system according to the independent claims.

According to a first aspect of the present invention, there is provided a method for configuring a co-simulation for a total system (and/or a total simulation) having at least a first sub-system and a second sub-system. The first sub-system may have at least one first parameter input and at least one first parameter output, wherein the first parameter output may be determinable based on the first parameter input by a first solution algorithm, and wherein the second sub-system may have at least one second parameter input and at least one second parameter output. The second parameter output may be determinable based on the second parameter input by a second solution algorithm.

According to the method, an interconnection network (or coupling network) may be determined, which may couple the first sub-system and the second sub-system at a coupling (or link) and determines, which one (or ones) of the first and the second parameter outputs may be determined as a coupling quantity (or linking quantity) for the corresponding first and second parameter inputs.

Which one (or ones) of the first and the second parameter outputs of the corresponding first and second sub-systems may be determined as coupling quantity for the corresponding first and second parameter inputs of other sub-systems (e.g. the other first and second sub-systems), may be defined by the operator of the co-simulation (eventually supported automatically, e.g. "name-mapping"). The determination of the interconnection network resulting therefrom may describe (or denote) the capturing of the physical relationships in the real world, from a data processing point of view, within the co-simulation network, e.g. via a directed graph, consisting of all sub-systems (the so-called knots), their parameter inputs and parameter outputs and the defined couplings (or interconnections) of the parameter inputs and outputs (the so-called edges).

Furthermore, first sub-system information (e.g. direct reach-through, input-output-dynamics, instantaneous frequency, simulation times, etc.) of the first sub-system and second sub-system information of the second sub-system may be determined.

As an example, a direct reach-through between a parameter input and a parameter output of a sub-system may exist in the case of a rigid mechanical coupling in a sub-system, where e.g. the position of a first mass may be predefined by a parameter input and thereby may reach through directly to the position of a rigidly coupled second mass as a parameter output (independent from the question, which force is necessary for this process). If for example the position of the first mass changes, then the position of the second mass may change correspondingly. The change must not be effected exclusively linearly. Generally, a direct reach-through may describe a static relationship between a parameter input x and a parameter output y in the form y=g(x), wherein g(x) may represent an arbitrary static mapping and/or a function. Thus, for example, a specific position y of a second mass can be derived directly on the basis of a predetermined characteristics in relation to a specific position x of a first mass. An according characteristics may run linearly or e.g. also exponentially. The corresponding direct change of a parameter output in respect of a parameter input may suggest a direct reach-through.

An input and/or output dynamics may describe the basic physical principles of a dynamic process between a parameter input and a parameter output of a sub-system. Mathematically, differential equations may serve to describe dynamic processes. If for example a mass m is moved by a force F as a parameter input and results in a change of the position and/or a change of the position x at the parameter output, then it can thereupon be concluded on the input and/or output dynamics, i.e. the physical-mathematical relation to each other, on the basis of the results of the parameter outputs with respect to the parameter inputs. In the example mentioned above, the input-output-dynamics may be described by the differential equation $d^2x/dt^2=F/m$, and may form the input and/or output dynamics between the parameter input and the associated parameter output. If the input-output-dynamics is estimated by using the parameters inputs and the parameter outputs, then it may be necessary to determine the parameters of the basic differential equation, for example the mass in the example mentioned above. To this end, the corresponding dynamics and/or the input and/or output dynamic can be determined on the basis of the relationship between the parameter input and the parameter output.

An instantaneous frequency (or present frequency) may describe the frequency contents of a coupling signal at a defined time (or point in time). In this respect, different physical effects may result in different instantaneous frequencies. For example, a wheel of a vehicle may rotate with a constant revolution speed at a constant velocity. During a braking maneuver, the revolution speed of the wheel may reduce and thus the instantaneous frequency of this parameter output and/or this parameter input may reduce. If additional friction effects occur (e.g. dynamic slippage of the wheel), then proportions of high frequencies may result, and thereby significant changes in the instantaneous frequency may result. If the revolution speed of a wheel decelerates, then the coupling signal may have a constant instantaneous frequency. If the revolution speed of a wheel is reduced erratically (or abruptly), for example due to the use of an anti-lock braking system, then significant changes in the instantaneous frequency can be determined.

Determining of sub-system information may comprise the obtaining of information which may be available in advance, such as e.g. the interconnection network and/or direct reach-through, and of information which may be generated at run time. Information generated at run time may be determined by a sub-system analysis, wherein the instantaneous simulation times of the sub-systems may be captured, the input/output dynamics may be estimated by methods from the system identification (e.g. via recursive least squares, or finite differences) and the instantaneous frequencies may be estimated by methods from the signal processing (e.g. Hilbert Huang Transformation), and "direct reach-throughs" may be determined by direct relationships between input and output (e.g. a linear or non-linear relationship).

Furthermore, an execution sequence (or performance order) may be selected, by which it may be determined, in which sequence (or order) relative to each other the first parameter output and the second parameter output are determined (and thus defines, which one (or ones) of the first and/or the second parameter outputs must be extrapolated for solving the causality problem).

By way of example, if a force represents a first parameter input of a first sub-system, which may represent a mechanical inertia, and a resulting change of position of the mass is available at the first parameter output, which may be configured as the second parameter input of a second sub-system, and this change of position in the second sub-system may result proportionally in a force (e.g. Kolumb friction) as a second parameter output, and this second parameter output may in turn be configured as a first parameter input, then the execution sequence may affect the physical behavior of the co-simulation. If the execution sequence is selected such that the force must be extrapolated, then extrapolation errors may affect the change of position of the mass in a weakened manner due to the inertia of the mass. On the contrary, if the execution sequence is selected such that the position of the mass must be extrapolated, then a proportionally amplified error at the second parameter output and/or of the force may result due to the proportional relationship in the second sub-system. Thus, the execution sequence may be crucial for a qualitative, high quality physical behavior of the total system.

Furthermore, extrapolation methods may be determined, by which the first and the second parameter inputs may be determinable during a macro step size (i.e. between the coupling times) in the case of a necessary estimation for solving the causality problem.

Extrapolation methods may influence the physical behavior of the total system differently. If for example the force acting on a mass is extrapolated by an extrapolation of zeroth order (the lastly known value is kept constant over the instantaneous time step), then this may result in a staircase-shaped course of the force and/or of the parameter input. These jumps in the force may have a crucial influence on the system behavior, as a function of the magnitude of the mass. No significant disturbances may be expected for a great mass. On the contrary, for a very small mass, the mass may be directly excited dynamically and may result in undesired vibrations (e.g. rigid contractions). In this connection, a corrective (or remedy) may be achieved by "smooth" extrapolated courses of the force. Thus, the selection of the extrapolation method may be crucial for a qualitative, high value physical behavior of the total system.

A macro step size (or macro increment) may be determined, which may prescribe the coupling times (or points in time), at which an exchange of the corresponding first and second input parameters and of the first and the second output parameters between the first and the second sub-systems may be performed, and which may define the extrapolation horizon of the first and the second input parameters.

The greater the macro step size, the further a parameter input may have to be extrapolated into the future and thus may have to some extent decisive influence on the physical behavior of the total system. By way of example, if a force is impressed as a parameter input on a mass in a sub-system and this parameter input is extrapolated over the defined macro step size over the extrapolation of zeroth order, then the mass may experience an excitation which is delayed in time. The resulting dynamic reaction of the mass may thus be influenced, which may result in stability problems. In this case, a smaller macro step size may result in a smaller delay in time, and thus possibly to a stabilized behavior of the total system. The selection of the macro step size and/or of the extrapolation methods may thus be decisive for a qualitative, high value physical behavior of the total system.

The coupling (or linking) of the first and the second sub-systems may be configured based on the interconnection network, the first sub-system information and the second sub-system information, the execution sequence, the extrapolation method and the macro step size, and the co-simulation may be performed during the macro time steps (or macro step sizes).

OVERVIEW OF EMBODIMENTS

A sub-system may have a sub-model, which may map a real model (e.g. a component part itself or a flow model of a component part etc.). A model may describe the behavior of a sub-system via algebraic and/or differential relationships. This sub-model may be established and simulated by a simulation tool (e.g. a CAD program). In order to model and to simulate a total system and thus to be able to make a truthful statement of the behavior of the total system in the real world, the total system may be build up from plural sub-systems. Each sub-system may solve a specific system area (flow model, structure model, temperature profile) of the total system. The individual sub-systems may exert influences among each other (or affect each other). Thus, for example, a specific temperature profile may result in a flow model or a structure model depending thereupon (e.g. a different deformation behavior of the structure model).

Input parameters may be those parameters, which the solution algorithm may require as an input, in order to therefrom possibly determine the simulation result and/or the output parameters. The input parameters may be e.g. temperature, geometrical data, force, revolution speed, environment parameters (e.g. outside temperature), flow, etc., which may be needed by the solution algorithm.

The solution algorithm (solver) may perform the desired simulation in a sub-system. In this connection, the first solution algorithm or the second solution algorithm may be the same or may differ. In addition, individual solution algorithms of the sub-systems may use different fixed or variable step sizes for solving the individual sub-systems. The solution algorithm may represent a numerical method, with which the output parameters can be determined from the input parameters and the modelled sub-systems.

The output parameters of the sub-systems may be defined values, which may be calculated and simulated by the associated solution algorithms. For example, these [values] may be geometrical values for forming a geometrical model, if for example a dynamical deformation behavior, which may be modelled via differential equations, may have to be simulated in a sub-system. For example, the voltage U of the algebraic sub-model $U=R*I$ can be simulated, wherein the resistance R may represent a model parameter which may be internal to the sub-system, and I may be the strength of current and accordingly may represent the input parameter. The input parameter I can be calculated in another sub-system and may be the corresponding output parameter there.

The interconnection network may determine how and which sub-systems are to be coupled with each other. The interconnection network may form a coupling between two sub-systems and defines, which one (or ones) of the first and the second parameter outputs may be defined as a coupling quantity for the corresponding first and second parameter inputs. A parameter output of a sub-system may be associated to plural parameter inputs of other sub-systems.

The coupling can be performed wire-bound or wireless for the exchange of the information.

The sub-system information may represent information of a sub-system, which may characterize the sub-system. The sub-system information may eventually be controlled and adapted, or may be influenced by the coupling with other sub-systems. The sub-system information may be, as is described below in more detail, e.g. a direct reach-through, input/output dynamics, instantaneous frequency and/or simulation times.

Sub-system information, such as the "direct reach-through" or the "input/output dynamics" may be available or known in advance for individual sub-systems. For example, this information could be provided together with the sub-system in the framework of additional information from the producer of the sub-system (e.g. the simulation tool). In this case, the analysis effort in the analysis of the sub-systems for individual sub-systems would reduce correspondingly.

In addition, the execution sequence may be selected, by which it may be determined, in which sequence relative to each other the first parameter output and the second parameter output are determined. In other words, it may be determined which sub-system is performed (i.e. simulated over the defined macro time step) when. For example, in the case of mutually influencing sub-systems, it may be advantageous to initially execute a defined sub-system, and to use the output parameters obtained therefrom for a following sub-system under the assumption of equal macro time steps without extrapolation of the input parameters (sequential execution). The execution sequence can be prescribed by the operator and/or be adapted in the step of configuring.

Furthermore, extrapolation methods may be determined, by which the first and the second parameter inputs may be determinable during a macro step size (e.g. between the coupling times). Different extrapolation methods may be used for individual first and second input parameters. If no parameter inputs are available, in particular for the instantaneous macro time step, these values may have to be extrapolated (estimated) and accordingly interpolated, in order to therefrom calculate the output parameters. For example, different extrapolation methods may be suitable for specific solution algorithms for solving the sub-systems, such that a suitable selection of the extrapolation method may positively influence the simulation results of the sub-systems.

The coupling of the first and the second sub-systems may be configured based on the interconnection network, the first sub-system information and the second sub-system information, the execution sequence, the extrapolation method, and the macro step size. Due to the taking into account of the elements mentioned above in the coupling of two or more sub-systems, the simulation result of the total simulation may be improved, because the configuration of the sub-systems relative to each other (e.g. execution sequence, the interconnection network etc.) and the configuration of the very sub-systems (macro step size, selection of extrapolation method) can be set and/or improved based on the determined information. Furthermore, the duration of the total simulation as well as the consumption of resources can be reduced in particular by an adapted and improved coupling.

Today, the operator of a co-simulation may be confronted with the challenge to configure the resulting total simulation. In the framework of the configuration, the operator may define e.g. the execution sequence of the sub-systems, and the extrapolation approaches as well as the corresponding macro step size may have to be prescribed for a plurality of coupling signals (e.g. input parameter or output parameter). The configuration may be improved by the approach according to the invention by taking into account in the configuration in particular the sub-system information, the interconnection network, the execution sequence, the extrapolation method and the macro step size.

According to a further exemplary embodiment of the method, the co-simulation may be finished or the co-simulation may be performed anew after a macro time step. In the case of an anew interactive performing of the method and/or of the co-simulation, the simulation results, the determined sub-system information (e.g. direct reach-through, input/output dynamics, instantaneous frequency, simulation times etc.) and the interconnection network and the configuration can be used, in order to adapt the execution sequence, the extrapolation methods and the macro step size in the cycle (or run) of the forthcoming simulation. Thus, the result of a co-simulation may optimize for each run, because an improved configuration of the coupling of the sub-systems may be performed from cycle to cycle.

According to a further exemplary embodiment example, an analysis of coupling events (e.g. discrete events, high system dynamics) may be performed after a macro time step, at the coupling time in the framework of a sub-system analysis, and the sub-system information of the first and/or the second sub-systems, the execution sequence, the extrapolation methods and/or the macro step size may be adapted and/or configured based on the analysis. For example, an erratic (or abrupt) course of a coupling signal during a simulation in a sub-system between the coupling times may mean that an improper execution sequence and/or an improper extrapolation method has been used (and thus improper input parameters have been determined) or the selection of the macro step size was improper (e.g. chosen too great). On the basis of this information, the selection of the execution sequence and/or the selection of the extrapolation method and/or the selection of the macro step size can be adapted in a new cycle of the co-simulation.

In the framework of an analysis of the sub-models, input and output parameters (coupling signals) of the sub-systems may be analyzed at run-time in respect of different properties. Input and output parameters of the sub-model may be used for example in a separate component for the analysis of the sub-model. Furthermore, the determination of the so-called "direct reach-through", the "input/output dynamics", the simulation times of the sub-systems, and a "frequency analysis" (instantaneous frequency) as well as a calculation time of the sub-systems and discrete events can be taken into account.

According to a further exemplary embodiment example, the sub-system information may comprise the input/output dynamics between the first input parameter and the first output parameter of the first sub-system and between the second input parameter and the second output parameter of the second sub-system.

The dynamical properties of the sub-systems between all available input/output combinations of the individual sub-systems may be referred to as "input/output dynamics" of the sub-systems. For example, a sub-system may have one and/or another input/output dynamics between an input and an output as compared to a further input and a further output of the sub-system or a further sub-system. These input/output dynamics of the sub-systems may be effected via methods for data-based system identifications of MIMO (multiple-input multiple-output) systems or input/output-specific by SISO (single-input single-output). The dynamics of the present sub-system may determine decisively, which type of solution algorithm or step size may have to be used in order to obtain a stable and precise numerical solution. In the method according to the invention, the input/output dynamics of the sub-systems may be used decisively to select the execution sequence and individual extrapolation methods.

According to a further exemplary embodiment example, the sub-system information may comprise a simulation time of the first sub-system and/or of the second sub-system. For example, a first sub-system may have a different simulation time as compared to the second sub-system (e.g. by using a different macro step sizes). For example, the macro step size or the execution sequence may be adapted based as a function of the individual simulation time of the sub-systems in order to improve the cycle (or run) of the co-simulation.

Supplementary, the fact may be noted, that the presented method and apparatus for configuring a co-simulation may also be used in the framework of a co-simulation in real-time. In contrast to a (non-real-time) co-simulation, a co-simulation in real-time requires that the sub-systems can be simulated in real-time and thus the first and the second parameter outputs can be determined in real-time, and thus may be available at defined points in time, the coupling times, as a function of the real-time (e.g. wall clock) for a further use (e.g. extrapolation).

According to a further exemplary embodiment, the sub-system information may comprise the required calculation times for performing the simulations of the individual sub-systems for the respective macro time steps, such that adaptations in the temporal behavior for the performing of the co-simulations in real-time can be performed, at the respective coupling times, by putting in relation the calculation times required by the sub-systems to (or with) the respective macro time steps of the sub-systems. By putting in relation the calculation times required by the sub-systems with the respective macro time steps of the sub-systems at the respective coupling times, bottlenecks in the temporal behavior for a performing of the co-simulation in real-time can be recognized, which may be counteracted by an advantageous configuration of the co-simulation during the run-time. For example, it can be taken into account in the step of the configuring, when e.g. a sub-system, which may require a shorter calculation time (as sub-system information) as a macro time step (which is defined e.g. in real-time). In this case, for example, the execution sequence of the sub-systems can be adapted or free computing capacities can be used otherwise in order to thus improve the co-simulation by configuration.

According to a further exemplary embodiment, the sub-system information may comprise an instantaneous frequency of the first and/or the second input parameters and/or of the first and/or the second output parameters.

In a "frequency analysis" of the coupling signals, individual coupling signals may be analyzed in respect of their frequency contents. The determination of the so-called instantaneous frequency, which can be determined by methods from the field of signal processing, may be in the focus of the analysis. By way of example, the instantaneous frequency may be determined by the so-called Hilbert-Huang-Transformation.

According to a further exemplary embodiment, the sub-system information may comprise a direct reach-through of the first and/or the second input parameters to the first and/or the second output parameters of the sub-systems.

In automatic control engineering, the term "direct reach-through" may refer to a system property, where a change at an input of a system may result directly and undelayed in a change (effect) at an output of the system. The detection of a "direct reach-through" can be effected e.g. by data-based methods of the system identification. In the context of the co-simulation, the integration of sub-systems with "direct reach-through" may result in algebraic loops, and thus to difficulties during the co-simulation and/or the superordinate solution process. For this reason, the knowledge, whether a direct reach-through exists between input and output quantities of sub-systems, may be of high interest and, therefore, may be consequently used in the method for automatic configuration of the co-simulation.

According to a further exemplary embodiment, the sub-system information may comprise an analysis of coupling events (discrete events, high system dynamics) of the first and/or the second input parameters and/or of the first and/or the second output parameters of the sub-systems.

According to a further exemplary embodiment, the step of determining the macro step size may have a determining of a first macro step size of the first sub-system and a determining of a second macro step size of the second sub-system. The first macro step size may prescribe first coupling times (or points in time), at which the first output parameter may be determinable respectively, wherein the second macro step size may prescribe second coupling times, at which the second output parameter may be determinable respectively.

In a co-simulation, different sub-systems may be involved, which can be simulated stepwise over different macro step sizes. By the application of different macro step sizes, there also may result different "simulation times" of the individual sub-systems. The simulation times may describe, how far the individual sub-systems have been simulated, and can be captured (or sensed) e.g. directly from the coupling signal data (i.e. the output parameters) having time stamps.

According to a further exemplary embodiment, the step of determining the extrapolation methods may have a determining of first extrapolation methods of the first sub-system, by which the first parameter inputs may be determinable during the first macro step size (and between the coupling times), and a determining of second extrapolation methods of the second sub-system, by which the second parameter inputs may be determinable during the second macro step size (and between the coupling times). Different extrapolation methods may be used for individual first and second input parameters.

According to a further aspect of the present invention, there is described an apparatus for configuring a co-simulation for a total system having at least a sub-system and a second sub-system. The first sub-system may have at least one first parameter input and at least one first parameter output, wherein the first parameter output may be determinable based on the first parameter input by a first solution algorithm. The second sub-system may have at least one second parameter input and at least one second parameter output, wherein the second parameter output may be determinable based on the second parameter input by a second solution algorithm.

The apparatus may have an interconnection unit (or coupling unit) for determining an interconnection network (or coupling network), which may couple the first sub-system and the second sub-system at a coupling (or interconnection) and may determine, which one (or ones) of the first and the second parameter outputs may be determined as coupling quantities for the corresponding first and second parameter inputs.

The apparatus further may have a determining unit for determining first sub-system information (direct reach-through, input/output dynamics, instantaneous frequency, simulation times, calculation time of the sub-systems, and discrete events) of the first sub-system and of second sub-system information of the second sub-system. The apparatus may further have a selection unit for selecting an execution sequence, by which it may be determined, in which sequence relative to each other the first parameter output and the second parameter output may be determined. The apparatus may further have an extrapolation unit for determining the extrapolation methods, by which the first and the second parameter inputs may be determinable during a macro step size (and between the coupling times). The apparatus may further have a step size unit for determining a macro step size and/or the macro step sizes, which may prescribe coupling times (or points in time), at which an exchange of the corresponding first and second input parameters and of the first and second output parameters between the first and the second sub-systems may be performed.

The apparatus may further have a configurator for configuring the coupling of the first and the second sub-systems based on the interconnection network, the first sub-system information and the second sub-system information, the execution sequence, the extrapolation methods, the macro step sizes, and for performing the co-simulation of the first and the second sub-systems.

The different units, in particular an interconnection unit, selection unit, extrapolation unit, step size unit and configurator etc. of the apparatus may each be realized as one processor. It may also be possible to implement an arbitrary combination and/or a plurality of these or other units as a common processor. Also, all units may be realized as a common processor.

According to a further exemplary embodiment, there is described a computer-readable storage medium, in which a program for configuring a co-simulation for a total system may be stored, which program may execute or control the method described above, when (or if) it is executed by a processor.

According to a further exemplary embodiment, there is described a program element for configuring a co-simulation for a total system, which program element may execute or controls the method described above, when (or if) it is executed by a processor.

In summary, the present invention may describe a method for an automated configuration of a co-simulation. An automated configuration of the co-simulation may be effected in view of the quality of the simulation results and may use, in summary, the following findings: the execution sequence of the simulation tools may determine, which coupling signals may have to be extrapolated; extrapolation errors may increase with increasing macro step sizes in the case of non-iterative co-simulation; and extrapolation methods may be suitable differently well for the coupling as a function of the application.

Considered in an abstract and general manner, in a co-simulation, sub-systems, which cannot be looked into, may be combined (or unified) to a total system by coupling (or interconnecting) the sub-system inputs and outputs. Information required for configuring a co-simulation thus may generally not be accessible for the operator. The interconnection network may provide an available information and describes, which sub-system inputs may be connected to which sub-system outputs. Beside the generally available interconnection network, in this method, the involved sub-systems may be analyzed at run-time, and further information for an automated configuration of the co-simulation may be extracted thereby.

The method according to the invention may build in addition also on detailed knowledge of the used extrapolation methods. Specifically, it may be referred here to mathematical models of the extrapolation methods, which may allow the derivation of a so-called "efficient bandwidth".

In the method according to the invention for an automated configuration of the co-simulation, further useful information can also be taken into account flexibly. By way of example, information with respect to the underlying and used numerical solution algorithms for simulating the individual sub-systems may be mentioned in this respect. Extrapolations of input quantities of a sub-system may cause undesired effects, such as e.g. run-time losses or numerical problems, in underlying solution algorithms. Also, e.g. information with respect to the dynamic of the sub-systems can be thought of.

Generally, a co-simulation may consist of at least two interacting sub-systems. By the exclusive and thus limited data exchange at discrete times (the coupling times (or points in time)) during the co-simulation, it may be mandatory to solve a causality problem by extrapolating the coupling quantities. In this connection, the execution sequence may decide decisively, which coupling quantities (input parameter) may have to be extrapolated and at which points coupling errors may be introduced into the total system. In the following, this may be discussed by way of example under the assumption of same macro time step sizes of the involved sub-systems. If all sub-systems are calculated in parallel, then all coupling signals in the couplings may have to be extrapolated over the defined macro time steps. By contrast thereto, if the first sub-system is calculated prior to the second sub-system and subsequently the third sub-system, then only the coupling signal in the second coupling between the third sub-system and the second sub-system may have to be extrapolated in each co-simulation step.

For solving the causality problem in the framework of the co-simulation, coupling signals may be extrapolated. The different extrapolation approaches, including measures for correcting the coupling error, may use coupling signal data which may be available at the present point in time. The selection of the extrapolation approach for specific application cases may be left over to the operator of a co-simulation. The method according to the invention disclosed herein may build on mathematical models of individual extrapolation approaches and may use features of the extrapolation derived therefrom. One example for such a feature may be the so-called "effective bandwidth", which can be determined from a transmission function of the individual linking. Macro time step sizes may define those discrete times (coupling times) during the co-simulation, at which the data exchange between sub-systems may be effected. Because different sub-systems may have different dynamics and, also, different extrapolation approaches may be used, basically, a different selection of macro time step sizes may be meaningful.

Embodiment examples of the present invention may be realized both by a computer program, that is a software, and also by one or more special electric circuits, that is in hardware (e.g. FPGA or ASIC), or in an arbitrary hybrid form, that is by software components and hardware components. The sub-systems may be simulated e.g. locally on one computer (also distributed on different computing kernels) or topologically network-distributed on different computers.

It is pointed out that the embodiments described herein may represent only a limited selection of possible embodiment variants of the invention. Thus, it may be possible to combine the features of individual embodiments in a suitable manner, such that a plurality of different embodiments is obviously to be considered as disclosed for the person skilled in the art by the explicit embodiment variants disclosed herein. In particular, some embodiments of the invention are described by device claims and other embodiments of the invention are described by method claims. However, it may immediately become clear for the person skilled in the art that, unless not explicitly stated differently, in addition to a combination of features, which may belong to one type of the invention object, also an arbitrary combination of features may be possible, which may belong to different types of invention objects.

DETAILED DESCRIPTION OF EXEMPLARY EMBODIMENTS

Figure 1:
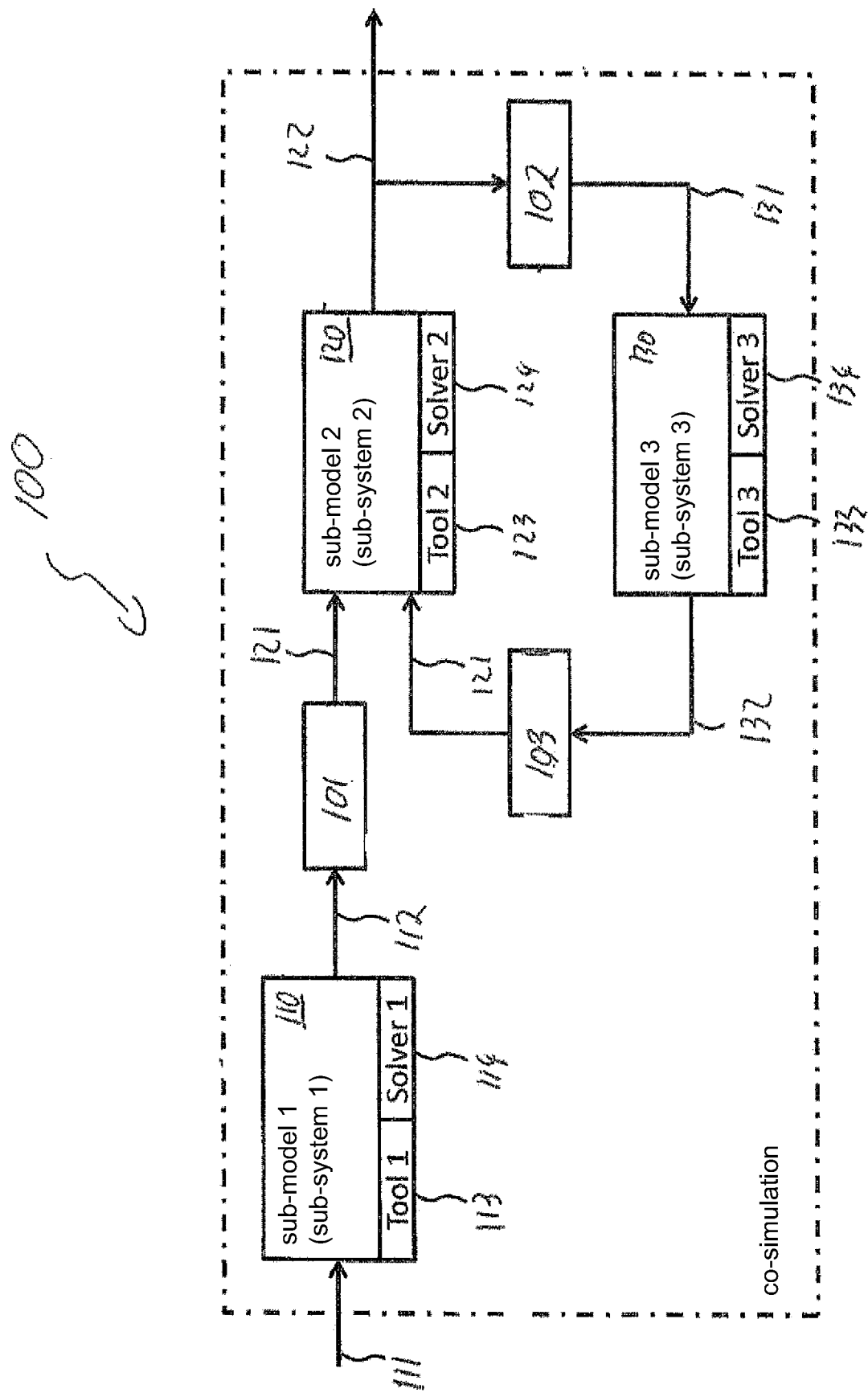
FIG. 1 shows a schematic representation of a co-simulation for a total system according to an exemplary embodiment of the present invention.

In the following, embodiment examples are described in more detail for a further explanation and for a better understanding of the present invention with reference to the appended drawings.

Same or similar components in different drawings are provided with the same reference numerals. The representations in the drawings are schematic.

FIG. 1 shows a schematic representation of a co-simulation for a total system 100 according to an exemplary embodiment of the present invention. In FIG. 1, a co-simulation may be built up from a first sub-model 110, a second sub-model 120 and a third sub-model 130. The first sub-system 110 may have at least one first parameter input 111 and at least one first parameter output 112, wherein the first parameter output 112 may be determinable (or can be determined) based on the first parameter input 111 by a first solution algorithm 114.

The second sub-system 120 may have at least one second parameter input 121 and at least one second parameter output 122, wherein the second parameter output 122 may be determinable based on the second parameter input 121 by a second solution algorithm 124.

The third sub-system 130 may have at least one third parameter input 131 and at least one third parameter output 132, wherein the second parameter output 132 may be determinable based on the third parameter input 131 by a third solution algorithm 134.

A sub-system 110, 120, 130 each may have a sub-model, which may map a real model (e.g. a component part itself or a flow model of a component part, etc.). A model may describe the behavior of a sub-system 110, 120, 130 via algebraic and/or differential relationships. This sub-model may be produced and simulated by a simulation tool 113, 123, 133 (e.g. a CAD program). In order to model and to simulate a total system 100 and thus to be able to make a truthful statement of the behavior of the total system 100 in the real world, the total system 100 may be built up from plural sub-systems 110, 120, 130. Each sub-system 110, 120, 130 may solve a specific system area (flow model, structure model, temperature profile) of the total system 100. The individual sub-systems 110, 120, 130 may affect (or influence) each other. Thus, for example, a particular temperature profile may result in a flow model or a structure model dependent therefrom (e.g. a different deformation behavior of the structure model).

The sub-systems 110, 120, 130 can be simulated locally on one computer (also distributed on different computing kernels), or topologically network-distributed on different computers.

The input parameters 111, 121, 131 may be those parameters, which the solution algorithm 114, 124, 134 may need as an input, in order to therefrom possibly determine the simulation result and/or the output parameters 112, 122, 132. The input parameters 111, 121, 131 may be e.g. temperature, geometrical data, rigidities, force, revolution speed, environment parameters (e.g. outside temperature), flow, etc., which may be required by the solution algorithm.

The solution algorithm (solver) 114, 124, 134 may perform the desired simulation in a sub-system 110, 120, 130. At this time, the first solution algorithm 114 or the second solution algorithm 124 may be the same, or may differ. In addition, individual solution algorithms of the sub-systems may use different fixed or variable step sizes for solving the individual sub-systems. The solution algorithm 114, 124, 134 may represent a numerical method, by which the output parameters 112, 122, 132 can be determined from the input parameters 111, 121, 131 and the modelled sub-systems 110, 120, 130.

The output parameters 112, 122, 132 in the sub-systems 110, 120, 130 may be defined values, which may be calculated and simulated by the solution algorithm 114, 124, 134. During a macro time step, also plural values of the output parameters 112, 122, 132 can be determined.

The first coupling 101 may take place between the first sub-system 110 and the second sub-system 120. At a defined coupling time, the first parameter may output and/or output parameters 112 from the first sub-system 110 may be obtained and may be provided to the second sub-system 120 as the second parameter inputs and/or input parameters 121. In a second coupling 102, for example, the second output parameter of the second sub-system 120 may be provided as the third input parameter 131 in the third sub-system 130.

Furthermore, a sub-system may, for example, may also have plural input parameters 121, which may be obtained from different sub-models 110, 130. In the present example, for example, a third output parameter 132 may be provided at a third coupling 103 as the second input parameter 121 to the second sub-system 120. At the same time, the first output parameter 112 may be provided via the first coupling 101 as a further second input parameter 121 to the sub-system 120.

From this, it may become clear that the sub-systems 120, 130 may affect each other mutually, wherein a co-simulation of the total system 100 can be improved by an improved configuration of the couplings 101, 102, 103 according to the method of the invention.

Figure 2:
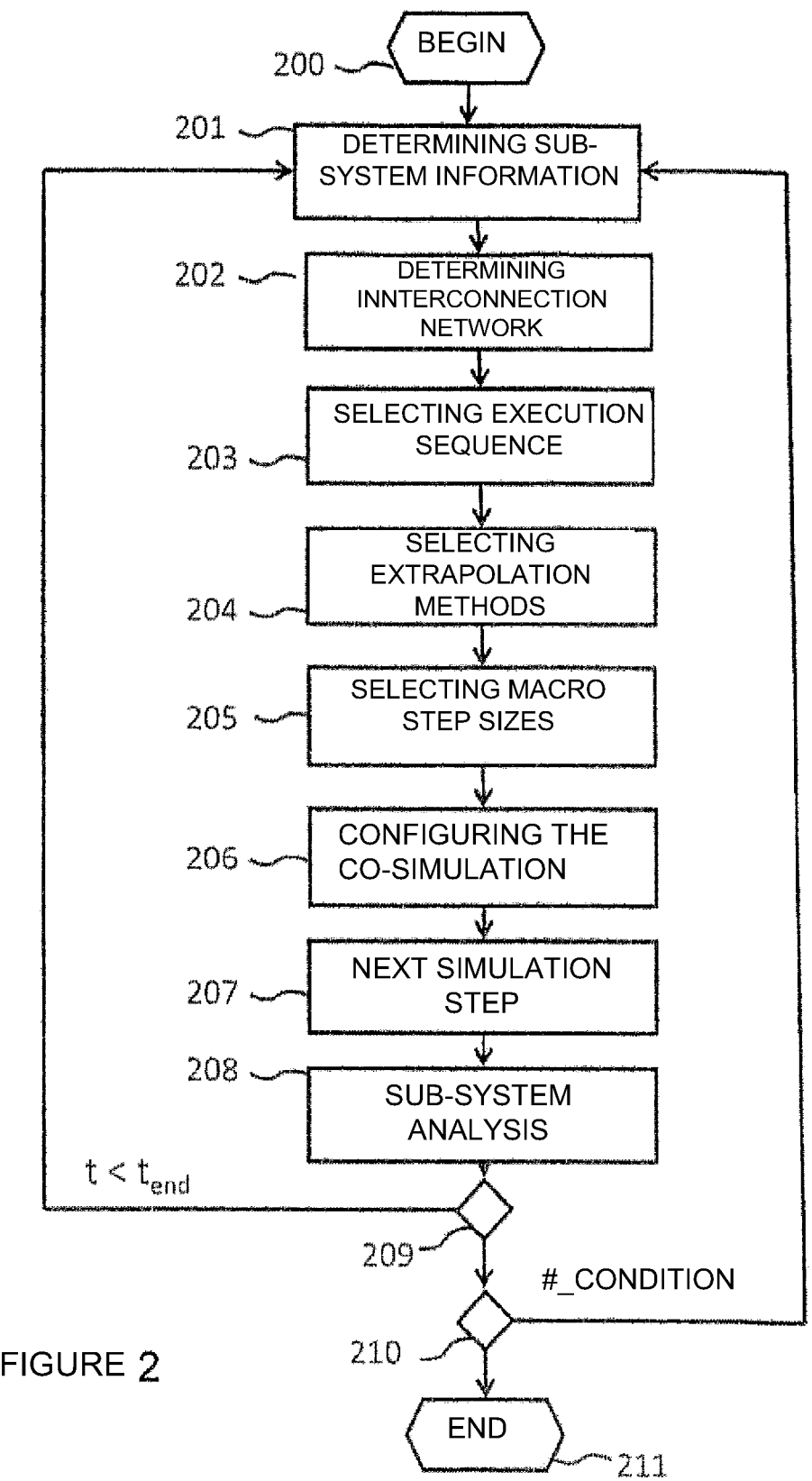
FIG. 2 shows a schematic representation of a course of the framework according to an exemplary representation of the method according to the invention.

FIG. 2 shows, in a combined view with the co-simulation from FIG. 1, an exemplary cycle (or run) of the method according to the invention. After the start 200, sub-system information 201 may be determined initially. In this connection, first sub-system information (e.g. direct reach-through, input/output dynamics, instantaneous frequency, simulation times) of the first sub-system 110 and second sub-system information of the second sub-system 120 may be determined. These sub-system information 201 may be consulted for the configuration in an initial step from a database or via a prescription from the operator. In subsequent, repeated performing of the method, the sub-system information, which may have been determined in preceding cycles of the method, can be drawn on (or used).

Furthermore, an interconnection network (or coupling network) 202 may be determined, which may couple the first sub-system 110 and the second sub-system 120 (or a plurality of further sub-systems) at couplings 101, 102, 103, and may determine, which one (or ones) of the first and the second parameter outputs 112, 122 may be determined as a coupling quantity for the corresponding first and second parameter inputs 111, 121.

Subsequently, a selection sequence 203 may be selected, by which it may be determined, in which sequence relative to each other the first parameter output 112 and the second parameter output 122 may be determined and thus may fixe (or prescribe) which first and/or second parameter inputs 121, 131 for solving the causality problem may have to be extrapolated.

Subsequently, extrapolation methods 204 may be determined, by which the first and the second parameter inputs 112, 122 can be determined during a macro step size (and between the coupling times).

Furthermore, a macro step size 205 may be determined, which may prescribe the coupling times, at which an exchange of the corresponding first and second input parameter 111, 121 and the first and the second output parameters 112, 122 between the first and the second sub-systems 110, 120 may be performed.

In conclusion, the coupling 101, 102, 103 of the first and the second sub-systems 110, 120 may be configured based on the interconnection network 202, the first sub-system information and the sub-system information, the execution sequence 203, the extrapolation method 204, the macro step size 205, and the co-simulation over the macro time step is performed.

After the start 200 of the co-simulation, information (e.g. sub-system information 201) which may be available, may be evaluated. For information, which may be available only during the co-simulation, e.g. default values may be used or may not be taken into account in the configuration. By superimposition of the information that may be available, e.g. the execution sequence 203 can be determined therefrom. On this basis and the information which may be available, subsequently, in a second step, suitable extrapolation methods 204 may be determined. In a next step, suitable macro step sizes 205 may be selected, such that continuatively the configuration 206 of the co-simulation for an upcoming macro time step in the co-simulation may be defined (or fixed). After this simulation step 207, i.e. at the next coupling time, a sub-system analysis 208 and an updating of the sub-system information, 201, which may have been collected up to this point in time, may be effected. If the end of the co-simulation is not reached after the simulation step ($t<t_{end}$), then this process may repeat with each simulation step until the end of the co-simulation is reached ($t=t_{end}$).

Figure 3:
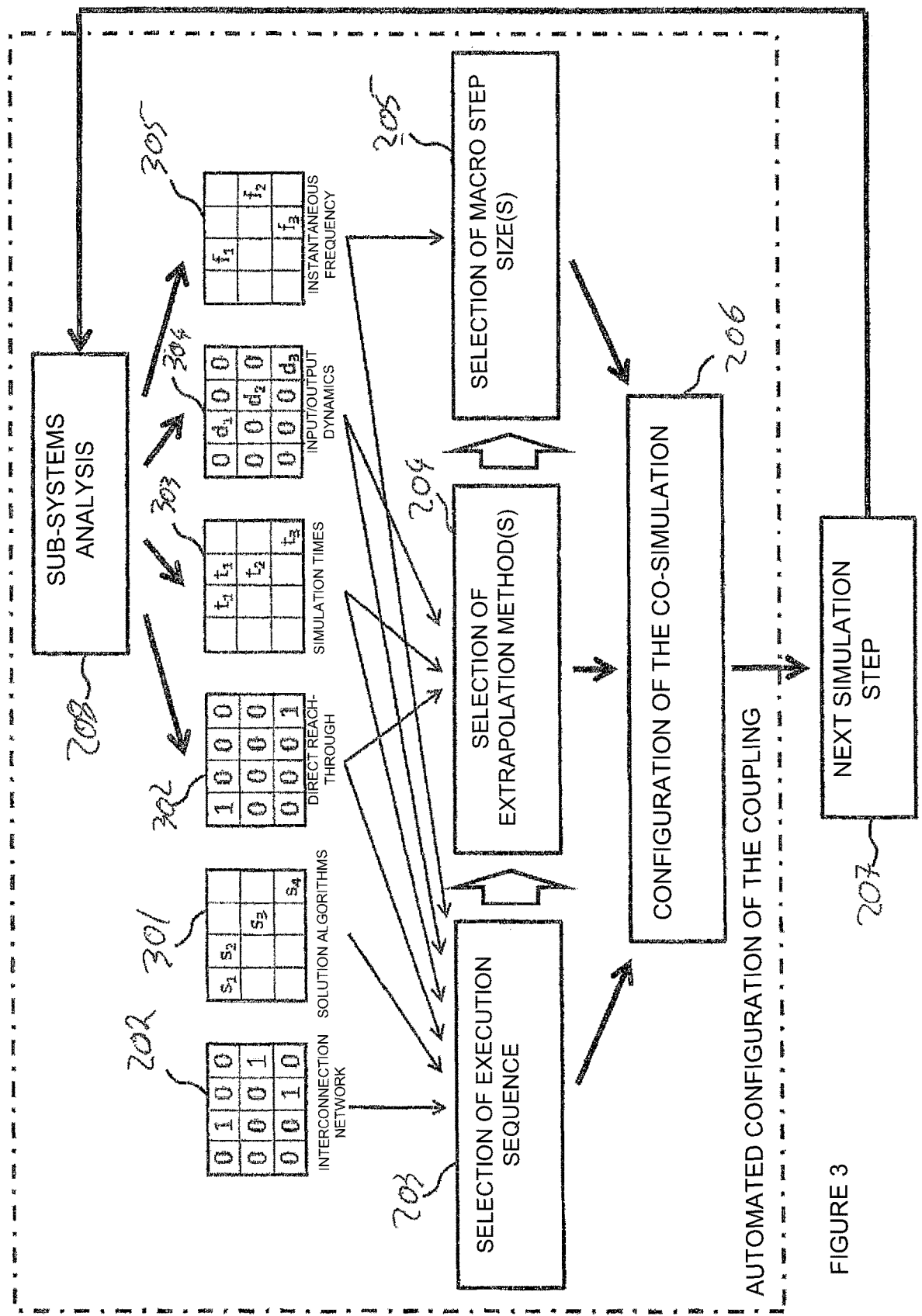
FIG. 3 shows a schematic representation of an exemplary embodiment of the present invention.

FIG. 3 describes a possible technical implementation of the method for automated configuration during ($t<t_{end}$) of the co-simulation. Two sub-systems 110, 120 may be interconnected via a coupling 101 to a co-simulation. After a presently finished configuration 206 and e.g. a thus calculated macro time step, a next simulation step 207 and an anew sub-system analysis 208 may be effected. In this step, the sub-systems 110, 120, 130 may be analyzed on the basis of the coupling data (the input parameters 111, 121, 131 and the output parameters 112, 122, 132), and relevant information, such as for example a direct reach-through 302, an input/output dynamics 304, an instantaneous frequency 305 and/or simulation times 303 of the configuration may be extracted and/or determined. From this database and together with further available information, such as for example the interconnection network 202 and the individual solution algorithms 301 (114, 124, 134) of the corresponding sub-systems 110, 120, 130, the selection of the execution sequence 203, the choice of the extrapolation methods 204 and the choice of the macro time step sizes 205 may be effected. In a further step 206, the co-simulation may be configured 206 with these settings. Subsequently, e.g. the macro time step may be calculated 207 and the process may repeat until the end ($t=t_{end}$) of the co-simulation.

Furthermore, FIG. 3 describes a possible implementation for storing the information, which may serve as a database for an automated configuration of the co-simulation. For an automated configuration of a co-simulation, the available data may be stored by way of example in different matrices (e.g. 202, 301, 302, 303, 304, 305). By way of example, different matrices may describe the interconnections of the inputs and outputs of all involved sub-systems 110, 120, 130 and/or the interconnection network 202, existing "direct reach-throughs" 302 of the sub-systems 110, 120, 130, input/output dynamics 304 of the sub-systems 110, 120, 130, the instantaneous frequencies 305 of the coupling signals (for example in couplings 101, 102, 103), underlying solution algorithms 301 if available, and/or also the instantaneous simulation times 303 of the individual sub-systems 110, 120, 130. This information may be extracted at run-time and/or subsequent to the simulation.

In the matrices, for example, the columns may form the parameter inputs of the sub-systems 110, 120, 130, and the rows may form the parameter outputs of the sub-systems 110, 120, 130.

The proposed method may analyze local (e.g. sub-system analysis) and global (e.g. interconnection network) information and may use these for a global configuration of the co-simulation.

Figure 4:
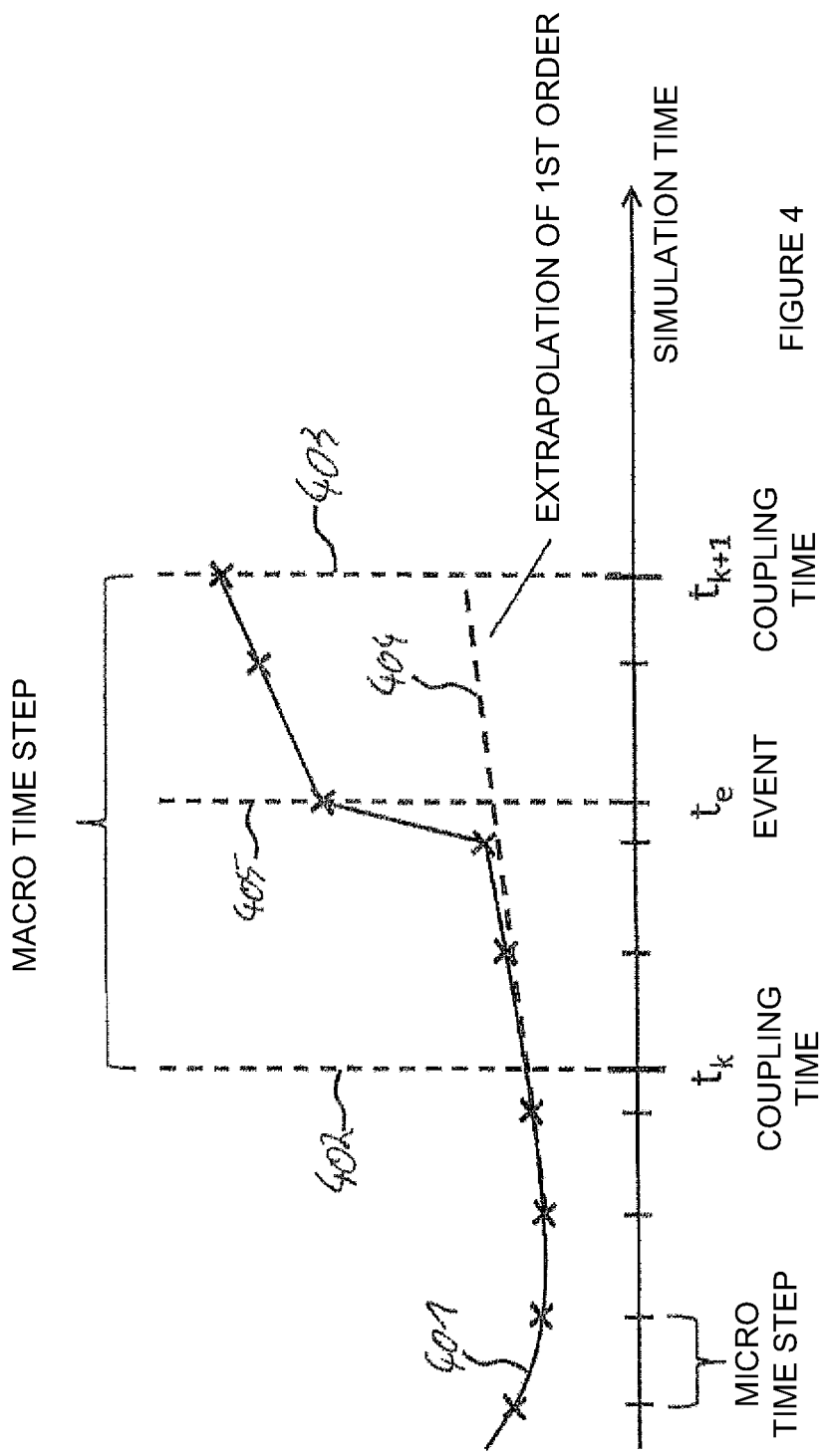
FIG. 4 shows a schematic representation of an extrapolation between two coupling times.

FIG. 4 shows an extrapolation between two coupling times (or points in time). In the non-iterative co-simulation, the involved sub-systems 110, 120, 130 may be solved exactly one time over each defined macro time step. The execution sequence 203, the type of extrapolation 204 and the choice of the macro time step size 205 may have to be fixed prior to the calculation, at the coupling time. If e.g. a discrete event or a high system dynamic occur during this macro time step, then the co-simulation may not have been configured according to the system behavior for this step. These circumstances of the case are graphically represented in FIG. 4. FIG. 4 shows a coupling signal 401, which may be defined at the macro time steps of the solution algorithm 114, 124, 134 of the sub-system 110, 120, 130. At the coupling time 402, the coupling signal 401 may be extrapolated over the macro time step to be calculated until the next coupling time 403 via an extrapolation of first order 404. The last two values from the history of the coupling signal 401 prior to the coupling time 402 may be used for this extrapolation. During the calculation of the macro time step, an event 405 now may occur at the time $t_e$ in one sub-system 110, 120, 130, which may result in a strong change of the coupling signal 401 at the time of the event 405, and thus also to a large deviation of the coupling signal 401 from the extrapolated course 404. A repetition of the simulation over this macro time step may be thought of, however may not be practically beneficial, because e.g. established simulation tools mostly do not offer a possibility to reset sub-system simulations to a preceding coupling time. In order to nevertheless guarantee an appropriate configuration, an extension of the automated configuration according to the method of the invention may be employed.

An automated configuration of the co-simulation may, according to circumstances, may be limited in its effectiveness by the non-iterative character. For this reason, as an extension of the method, a repeated co-simulation of the same co-simulation is proposed here, in which knowledge from the preceding simulation cycles may be used and, accordingly, (automated) configurations of the execution sequence 203, the type of the extrapolation 204 and the choice of the macro time step size 205 may be carried out. Those points, where there may be a need for action in the configuration, may already be known from the history of the sub-system analyses 208, and may be addressed according to the above described guidelines for automated configuration for the subsequent co-simulation cycle. In FIG. 2, this extension is put on record by an additional interrogation 210. If the condition "#_condition" is satisfied in the interrogation 210, then, based on the available coupling signals and also from sub-system information generated from sub-system analyses 208, configurations may be effected automatedly after the end of the co-simulation ($t=t_{end}$). The condition "#_condition" may be satisfied, if the operator activates this function AND a maximum number of iterations is not reached OR if a defined quality of the co-simulation is reached (logical AND with priority to logical OR).

Supplementarily, it is to be noted, that "having" (or "comprising") does not exclude other elements or steps, and "a" or "an" does not exclude a plurality. Furthermore, it is

LIST OF REFERENCE NUMERALS 100 total system
110 first sub-system
111 first input parameter
112 first output parameter
113 first simulation tool (tool 1)
114 first solution algorithm (solver 1)
120 second sub-system
121 second input parameter
122 second output parameter
123 second simulation tool (tool 2)
124 second solution algorithm (solver 2)
130 third sub-system
131 third input parameter
132 third output parameter
133 third simulation tool (tool 3)
134 third solution algorithm (solver 3)
101 first coupling
102 second coupling
103 third coupling
200 begin
201 determining sub-system information
202 determining interconnection network
203 selecting an execution sequence
204 determining an extrapolation method
205 determining a macro step size
206 configuring the co-simulation
207 next simulation step
208 analysis
209 decision anew cycle
210 decision end
211 end
301 determining solution algorithms
302 determining the direct reach-through
303 determining the simulation times
304 determining the input/output dynamics
305 determining the instantaneous frequency
401 coupling signal
402 coupling time
403 coupling time
404 extrapolation of first order
405 event

The invention claimed is:

1. A method for automatically configuring a co-simulation for a total system having at least a first sub-system and a second sub-system,
wherein the first sub-system has at least one first parameter input and at least one first parameter output,
wherein the first parameter output is determinable based on the first parameter input by a first solution algorithm, and
wherein the second sub-system has at least one second parameter input and at least one second parameter output,
wherein the second parameter output is determinable based on the second parameter input by a second solution algorithm,
the method comprising:
determining an interconnection network, which couples the first sub-system and the second sub-system at a coupling and determines, which one of the first and the second parameter outputs is determined as a coupling quantity for the corresponding first and second parameter inputs,
determining first sub-system information of the first sub-system and second sub-system information of the second sub-system,
selecting an execution sequence, by which it is determined in which sequence relative to each other the first parameter output and the second parameter output are determined and thus is defined which first and/or second parameter inputs have to be extrapolated,
determining extrapolation methods, by which the first and second parameter inputs are determinable during a macro step size,
determining a macro step size which prescribes coupling times, at which an exchange of the corresponding first and second input parameters and of the first and second output parameters between the first and the second sub-systems is performed,
configuring the coupling of the first and the second sub-systems based on the interconnection network, the first sub-system information and the second sub-system information, the execution sequence, the extrapolation methods, and the macro step size, and
performing the co-simulation during the macro time step;
wherein the coupling is configured automatically for each simulation step, wherein for each simulation step at the coupling time a sub-system analysis is performed, and the execution sequence, the extrapolation methods and the macro step size are automatically adapted for the next simulation step_based on the sub-system information of the first and/or the second subsystems and the interconnection network,
wherein the determination of the extrapolation methods is based on the detection of direct reach-through, on simulation times and on input/output dynamics.

2. The method according to claim 1,
wherein, after a macro time step, the co-simulation is finished or the co-simulation is performed anew.

3. The method according to claim 1,
wherein the sub-system information being determined for each simulation step comprises the input-output dynamics of the sub-systems between the first input parameter and the first output parameter of the first sub-system, between the second input parameter and the second output parameter of the second sub-system, and between a third input parameter and a third output parameter of a third sub-system.

4. The method according to claim 1,
wherein the sub-system information being determined for each simulation step comprises a simulation time of the first sub-system and/or of the second sub-system.

5. The method according to claim 1,
wherein the sub-system information being determined for each simulation step comprises an instantaneous frequency of the first and/or the second input parameters and/or of the first and/or the second output parameters.

6. The method according to claim 1,
wherein the sub-system information being determined for each simulation step comprises a direct reach-through of the first and/or the second input parameters on the first and/or the second output parameters of the sub-systems.

7. The method according to claim 1,
wherein the sub-system information comprises an analysis of coupling events of the first and/or the second input parameters and/or of the first and/or the second output parameters of the sub-systems.

8. The method according to claim 1,
wherein the step of determining the macro step size has the following:
determining a first macro step size of the first sub-system,
wherein the first macro step size prescribes first coupling times, at each of which the first output parameter is determinable,
determining a second macro step size of the second sub-system,
wherein the second macro step size prescribes second coupling times, at each of which the second output parameter is determinable.

9. The method according to claim 8,
wherein the step of determining the extrapolation methods has the following:
determining first extrapolation methods of the first sub-system, by which the first parameter inputs are determinable during the first macro step size,
determining second extrapolation methods of the second sub-system, by which the second parameter inputs are determinable during the second macro step size.

10. The method according to claim 1, wherein the automatic configuration is based on that the execution sequence determines, which coupling signals have to be extrapolated, on that extrapolation errors increase with increasing macro step sizes in the case of a non-iterative co-simulation, and on that the extrapolation methods are suitable differently well for the coupling as a function of an application.

11. The method according to claim 1, wherein the selection of the execution sequence is based on the interconnection network, on the solution algorithms, on the detection of direct reach-through, on the simulation times, on the input/output dynamics and on an instantaneous frequency.

12. An apparatus for automatically configuring a co-simulation for a total system having at least a first sub-system and a second sub-system,
wherein the first sub-system has at least a first parameter input and at least a first parameter output,
wherein the first parameter output is determinable based on the first parameter input by a first solution algorithm, and
wherein the second sub-system has at least a second parameter input and at least a second parameter output,
wherein the second parameter output is determinable based on the second parameter input by the second solution algorithm,
the apparatus comprising:
an interconnection unit for determining an interconnection network, which couples the first sub-system and the second sub-system at a coupling, and determines, which one of the first and the second parameter outputs is determined as a coupling quantity for the corresponding first and second parameter inputs,
a determining unit of first sub-system information of the first sub-system and second sub-system information of the second sub-system,
a selection unit for a selection of an execution sequence, by which it is determined, in which sequence relative to each other the first parameter output and the second parameter output are determined,
an extrapolation unit for determining extrapolation methods, by which the first and the second parameter inputs are determinable individually during a macro step size,
a step size unit for determining a macro step size, which prescribes coupling times, at which an exchange of the corresponding first and the second input parameters and of the first and the second output parameters between the first and the second sub-systems is performed,
a configurator for configuring the coupling of the first and the second sub-systems based on the interconnection network, the first sub-system information and the second sub-system information, the execution sequence, the extrapolation methods, and the macro step sizes, and for performing the co-simulation during the macro step size;
wherein the coupling is configured automatically for each simulation step, wherein for each simulation step at the coupling time a sub-system analysis is performed, and the execution sequence, the extrapolation methods and the macro step size are automatically adapted for the next simulation step based on the sub-system information of the first and/or the second subsystems and the interconnection network,
wherein the determination of the extrapolation methods is based on the detection of direct reach-through, on simulation times and on input/output dynamics.

* * * * *